April 2, 1968  R. B. DRAKE  3,375,946
RETRACTABLE HITCH FOR TILTING BED TRUCKS
Filed Feb. 9, 1966  2 Sheets-Sheet 1

INVENTOR
ROBERT B. DRAKE

BY *B. P. Fishburn, Jr.*

ATTORNEY

April 2, 1968  R. B. DRAKE  3,375,946
RETRACTABLE HITCH FOR TILTING BED TRUCKS
Filed Feb. 9, 1966  2 Sheets-Sheet 2

INVENTOR
ROBERT B. DRAKE

BY  B.P. Fishburn, Jr.

ATTORNEY

United States Patent Office 3,375,946
Patented Apr. 2, 1968

3,375,946
RETRACTABLE HITCH FOR
TILTING BED TRUCKS
Robert B. Drake, 600 S. 31st St.,
Springfield, Ill. 62703
Filed Feb. 9, 1966, Ser. No. 526,291
5 Claims. (Cl. 214—505)

ABSTRACT OF THE DISCLOSURE

A hitch mechanism for tilting bed vehicles enabling the towing of heavy equipment with stability characterized by a linkage on the tilt bed carrying the hitch mechanism and having a connection with a non-tilting portion of the vehicle, whereby tilting of the bed by power means causes the hitch mechanism to retract so as to clear the ground and to return to a normal towing position when the bed is returned to level.

---

This invention relates to hitch devices for vehicles and more particularly to a retracting or folding heavy duty hitch forming a part of the operating mechanism of a tilt bed truck.

The main objective of the invention is to provide a hitch which will enable tilt bed trucks to haul heavy equipment or trailers with stability and without dangerous swaying of the trailer at highway speeds. This is accomplished in the invention by the provision of a hitch which is close to the rear end of the tilting truck bed, thereby rendering it possible to employ a very short draft tongue on the trailing vehicle or equipment, as contrasted with a long tongue which is an unstable arrangement. When the bed of the towing truck is tilted downwardly by power means, the hitch mechanism retracts upwardly and forwardly so as to clear the ground, and then returns to the normal working position when the truck bed is level. The invention allows the towing vehicle to haul very heavy equipment, such as a crawler tractor or trenching machine on a tandem trailer, with safety, because of the possibility of employing a short draft tongue which eliminates swaying, as stated.

Another object of the invention is to provide a folding hitch mechanism which is simple in construction, rugged and durable, and reliable in operation.

Another object is to provide a combined hitch and operating mechanism for a tilt bed truck.

Other objects and advantages of the invention will be apparent during the course of the following detailed description.

In the accompanying drawing, forming a part of this application and in which like numerals are employed to designate like parts throughout the same, FIGURE 1 is a fragmentary side elevation of the invention in the active or towing position;

Figure 1:
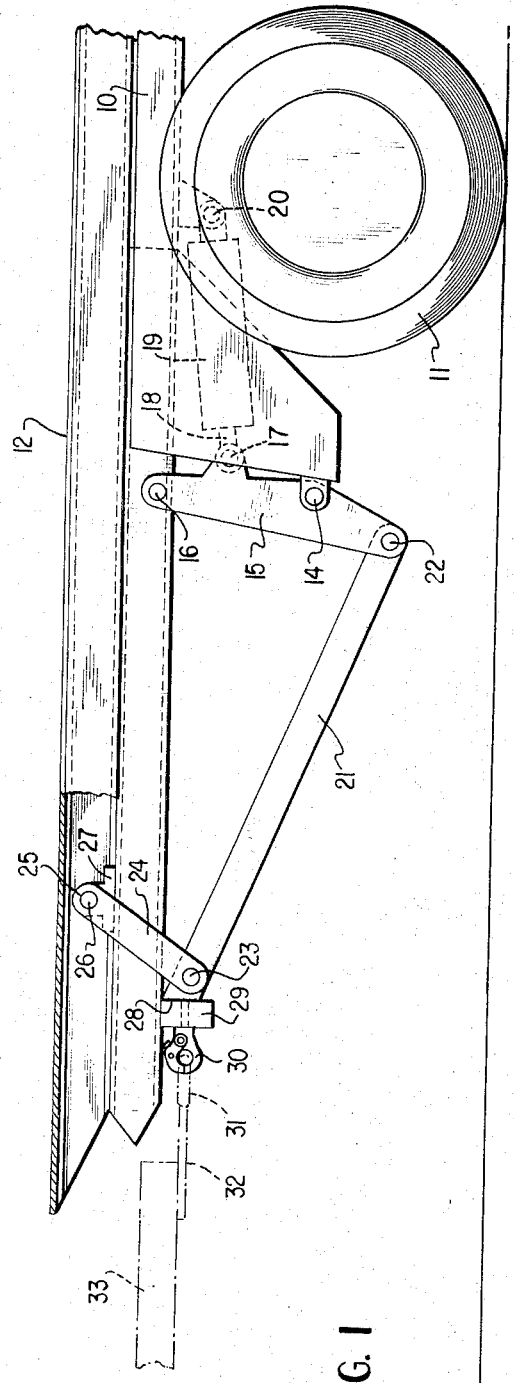

In the drawings wherein for the purpose of illustration is shown a preferred embodiment of the invention, the numeral 10 designates the rear end portion of an automotive truck chassis having rear wheels 11. The truck has a flat bed 12 adapted to assume an inclined position with its rear end contacting the ground, FIGURE 2, so that the bed may form a ramp for the loading or unloading of mobile equipment, such as a crawler tractor or the like. As stated, the invention is concerned with a towing hitch which forms a part of the mechanism for tilting the bed 12 and returning it to the level position shown in FIGURE 1.

This mechanism comprises a pair of rigid bracket plates 13 on the rear end of the chassis 10 and being vertically disposed inwardly of the wheels 11. Pivotally mounted upon the bracket plates 13 near their rear lower corners, as indicated at 14, is a pair of vertically swingable primary operating levers 15 which extend above and below their pivot elements 14, as shown. The tops of the levers 15 are pivoted directly as at 16 to the tilting bed 12 of the truck. Intermediate the pivots 14 and 16, the operating levers 15 have their front sides pivotally connected as at 17 with the piston rods 18 of fluid pressure power cylinders or rams 19 whose forward ends are in turn pivoted at 20 to the underside of chassis 10.

The lower ends of levers 15 are pivotally secured to the rear ends of long links 21 by a cross pin 22 or the like, and the cross pin 22 is spaced from the pivot 14 a lesser distance than the upper pivot element 16.

The forward ends of long links 21 are in turn pivotally connected at 23 with short operating links 24 whose upper ends are connected at 25 with a cross pivot shaft 26 whose end portions are held in sturdy bearings 27 on the rear end portion of the tilting truck bed. It may now be seen that the levers 15 and links 21 and 24 and their various pivots form with the tilting bed 12 a modified parallelogram-type linkage and the bed 12 is bodily carried on the operating mechanism directly through the elements 16 and 25. The entire mechanism is supported to the pivot elements 14 on the bracket plates 13.

Figure 2:
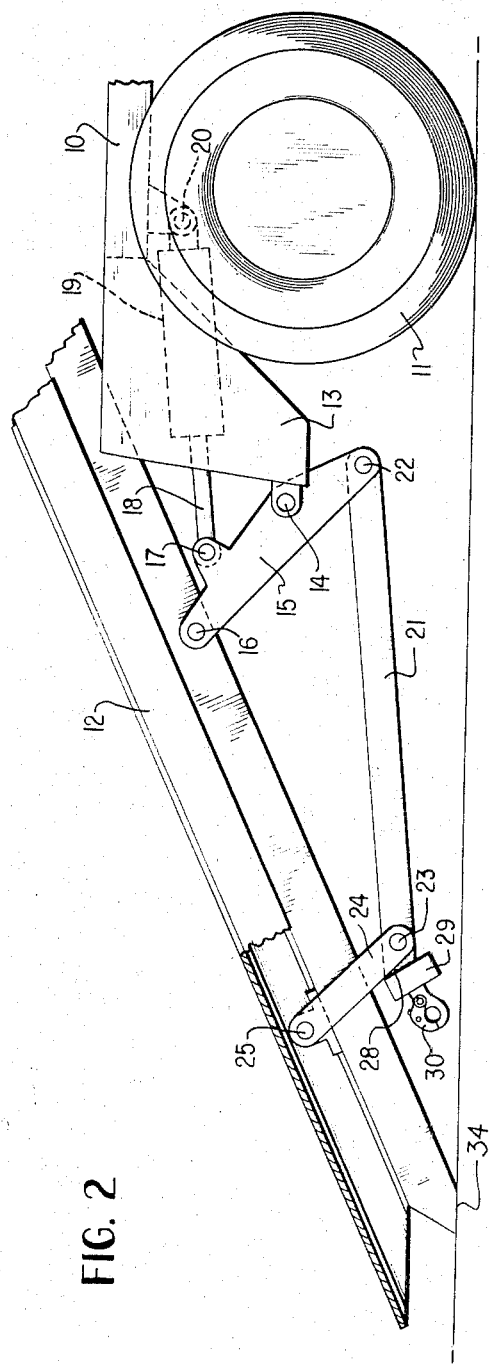
FIGURE 2 is a similar view of the invention in the inactive or retracted position when the truck bed is tilted.
Figure 3:
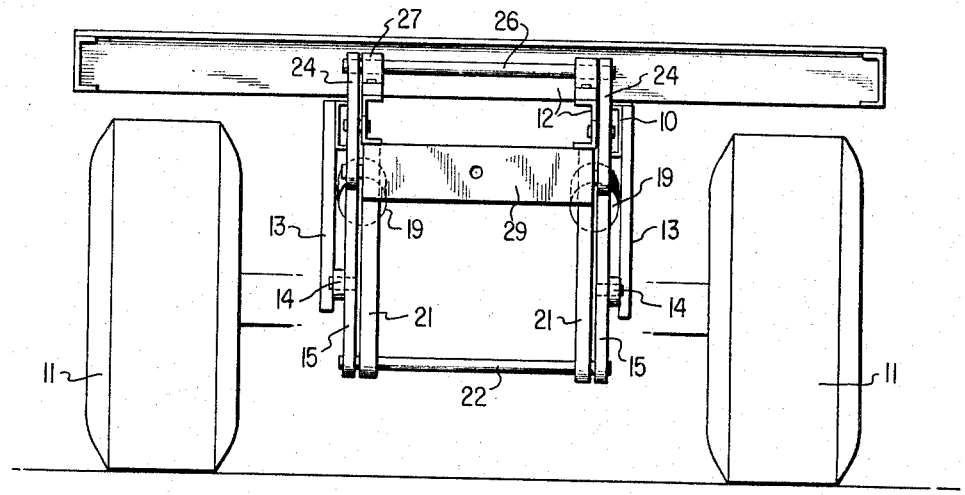
FIGURE 3 is a rear elevational view of the invention, with parts omitted.
Figure 4:
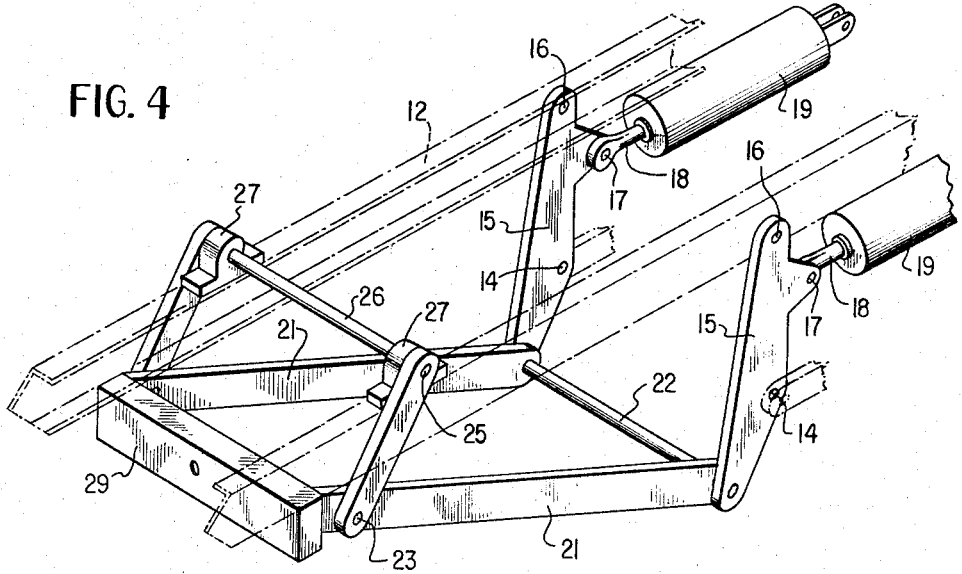
FIGURE 4 is a perspective view of the invention.

The rear ends of the long links 21 project slightly rearwardly of pivots 23 and terminate in diagonal faces 28. A sturdy transverse hitch bar or member 29 is suitably rigidly secured to the faces 28 by welding or the like and assumes an angle to the long links 21, as shown in FIGURES 1 and 2. At the longitudinal center of the hitch bar 29, a pintle hook 30, ball type hitch, clevis or any other conventional form of hitch element is firmly mounted upon the hitch bar. The hitch element 30 has been omitted from the drawings in FIGURES 3 and 4 for simplicity. The pintle hook 30, shown in FIGURE 1, is adapted to be coupled to the eye 31 of a short draft tongue 32 on a low trailer 33, which may support a heavy piece of road machinery or the like. It is to be noted in FIGURE 1 that the pintle hook 30 is quite close to the rear end of the bed 12, thus enabling the use of a short draft tongue on the trailer. This eliminates much of the swaying between the two vehicles and renders the caravan much more stable and safe during operation on a highway, and this is the prime purpose of the invention, as stated.

When the pintle hook is disconnected from the tongue 32 of the trailer and the two vehicles are separated, the bed 12 of the towing truck may be moved to the inclined position shown in FIGURE 2 by extension of the power cylinders 19, as shown. The operating linkage including levers 15 and links 24 will swing the truck bed 12 bodily rearwardly and downwardly from the chassis 10 for loading or unloading. At this time, the lower ends of levers 15 swing forwardly and upwardly from their positions shown in FIGURE 1 as do the rear links 24. The linkage moves the hitch bar 29 and hitch element 30 forwardly and upwardly to a retracted position, whereby the hitch element will clear the ground even though the rear of the tilted bed is engaging the ground as at 34. When the fluid pressure operated power cylinders have their rods 18 retracted, the parts return to their relative positions in FIGURE 1 where the top of the hitch bar 29 is abutting the bottom face of the truck bed, as shown. The mechanism is very simple and it allows the placement of the hitch very close to the rear of the truck bed 12 for the stated reasons, and still allows full tilting of the truck bed without having the operating linkage touch the ground. The advantages of the invention should now be apparent to those skilled in the art, without the necessity for any further description. The invention resides in the combination of a hitch means on the operating linkage of a tilting bed truck, with the hitch means and linkage moving between active and retracted positions automatically as the truck bed assumes level and tilted positions, respectively.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A hitch mechanism for tilt bed trucks comprising in combination with a truck chassis, a tilt bed on said chassis shiftable between level and inclined positions, a pair of operating arms pivoted to the tilt bed and pivotally mounted upon said chassis, power means on the chassis connected with said arms and causing the arms to swing vertically, links pivoted to the tilt bed rearwardly of said arms, additional links pivotally interconnecting the first-named links and said arms, and hitch mechanism carried by the rear ends of said additional links and near the first-named links, whereby tilting of said bed so that the rear end thereof will substantially engage the ground effects an upward and forward retraction of the hitch mechanism so that the same will clear the ground.

2. The invention as defined by claim 1, and wherein said operating arms are longer than the first-named links and are pivoted intermediate their ends to the chassis, the tops of said arms being pivoted to the tilt bed and their lower ends being pivoted to said additional links, said power means connected with said arms between their pivotal connections with the chassis and tilt bed.

3. The invention as defined by claim 2, and wherein the power means comprises at least one fluid pressure operated extensible and retractable device on said chassis.

4. A hitch mechanism for tilting bed trucks comprising in combination with a truck chassis, a tilting bed on the chassis shiftable between level and tilted positions, operating arm means for the tilting bed having a pivotal connection therewith and having a pivotal connection with the truck chassis, first link means pivotally connected with the tilting bed rearwardly of the arm means, second link means pivotally interconnecting the arm means and first link means, a hitch bar carried on the rear of the second link means beneath the rear end portion of the tilting bed, and a hitching element on said bar projecting rearwardly thereof, said bar and element swingable to a retracted ground clearing position when the bed is tilted so that the rear end of the bed may substantially contact the ground.

5. The invention as defined by clim 4, and wherein the hitching element comprises a pintle hook on the hitch bar near the center thereof.

References Cited

UNITED STATES PATENTS

| | | | |
|---|---|---|---|
| 2,229,258 | 1/1941 | Ronk | 280—491 XR |
| 3,142,394 | 7/1964 | Schwartz | 214—85 |

GERALD M. FORLENZA, *Primary Examiner.*

ALBERT J. MAKAY, *Examiner.*